(12) United States Patent
Fahimi et al.

(10) Patent No.: US 10,101,145 B2
(45) Date of Patent: Oct. 16, 2018

(54) PASSIVE TEMPERATURE ERROR COMPENSATION FOR STRAIN GAUGE PRESSURE SENSORS

(71) Applicant: Rosemount Aerospace Inc., Burnsville, MN (US)

(72) Inventors: Saeed Fahimi, Bloomington, MN (US); Cuong Tho Huynh, Shakopee, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 256 days.

(21) Appl. No.: 15/000,686

(22) Filed: Jan. 19, 2016

(65) Prior Publication Data

US 2017/0205220 A1  Jul. 20, 2017

(51) Int. Cl.

| G01L 9/04 | (2006.01) |
|---|---|
| G01B 7/16 | (2006.01) |
| G01L 9/00 | (2006.01) |

(52) U.S. Cl.
CPC .............. *G01B 7/18* (2013.01); *G01L 9/0051* (2013.01)

(58) Field of Classification Search
CPC ....... G01B 7/18; G01L 9/0051; G01L 9/0002; G01L 9/0057; G01L 9/008; G01L 7/00;
(Continued)

(56) References Cited

U.S. PATENT DOCUMENTS 4,172,389 A * 10/1979 Branch ................ G01D 3/0365
73/766
4,174,639 A * 11/1979 Raven .................. G01D 3/0365
73/766
(Continued)

FOREIGN PATENT DOCUMENTS

| CN | 102072791 A | 5/2011 |
|---|---|---|
| EP | 0086462 A2 | 8/1983 |

(Continued)

OTHER PUBLICATIONS

Extended European Search Report for EP Application No. 17152014.1, dated Jun. 19, 2017, 17 pages.

(Continued)

*Primary Examiner* — Manish S Shah
*Assistant Examiner* — Nigel Plumb
(74) *Attorney, Agent, or Firm* — Kinney & Lange, P.A.

(57) ABSTRACT

A sensor system includes a plurality of strain gauges and a passive compensation circuit. The plurality of strain gauges are configured to provide an output voltage indicative of a sensed pressure using an input voltage. The passive compensation circuit that includes a span resistor, first and second compensation resistors, and a zero offset resistor. The span resistor is connected between an input voltage and the pressure sensor and is configured to control a range of an output voltage for a pressure range of the pressure sensor. The first and second compensation resistors are operatively connected in parallel with the pressure sensor and are configured to control current provided to the pressure sensor. The zero offset resistor is operatively connected between the first and second compensation resistors and the pressure sensor and is configured to control a base value of the output voltage for zero pressure.

14 Claims, 3 Drawing Sheets

(58) Field of Classification Search
CPC ....... G01L 19/04; G01L 1/225; G01L 1/2281; G01P 13/025
See application file for complete search history.

(56) References Cited

U.S. PATENT DOCUMENTS

| | | | | |
|---|---|---|---|---|
| 4,480,478 | A * | 11/1984 | Sato | G01L 9/065 73/708 |
| 5,042,307 | A * | 8/1991 | Kato | G01L 1/2281 73/708 |
| 6,098,464 | A * | 8/2000 | Avisse | G01D 3/036 324/648 |
| 6,973,837 | B2 * | 12/2005 | Barnett | G01D 3/022 73/765 |
| 2013/0239695 | A1 * | 9/2013 | Tai | G05F 3/30 73/766 |
| 2015/0114128 | A1 * | 4/2015 | Norian | G01L 9/065 73/708 |

FOREIGN PATENT DOCUMENTS

| | | | |
|---|---|---|---|
| EP | 0409213 | A2 | 1/1991 |
| FR | 2690524 | A1 | 10/1993 |

OTHER PUBLICATIONS

"Fabrication and temperature coefficient compensation technology of low cost high temperature pressure sensor" Sensors and Actuators A: Physical Elsevier BV, NL. vol. 120, No. 2. May 17, 2005.

* cited by examiner

PASSIVE TEMPERATURE ERROR COMPENSATION FOR STRAIN GAUGE PRESSURE SENSORS

BACKGROUND

The present invention relates generally to sensors, and in particular to a system and method for passive temperature error compensation for strain gauge pressure sensors.

Strain gauge sensors may be utilized to sense strain based on a change in electrical resistance of the strain gauge. This change in resistance is utilized to determine the strain on the element. However, the change in resistance is also dependent upon temperature. This can be an important factor in aircraft applications, for example, in which a large variety of temperatures may be encountered. The output error in these applications can be as high as 20% or greater for the strain gauge sensor.

To minimize this error, prior art systems implemented active compensation circuits. These circuits require at least a temperature sensor and a microcontroller. The temperature sensor senses the present temperature near the sensor and provides it to the microcontroller. The microcontroller then calculates a compensation based upon the temperature and the present output of the strain gauge sensor. Active compensation circuits can be expensive and in some environments, cannot be used at all due to extreme temperatures. It is desirable to minimize the error in strain gauge sensor output caused by temperature variation without the need for active compensation circuitry.

SUMMARY

A sensor system includes a plurality of strain gauges and a passive compensation circuit. The plurality of strain gauges are configured to provide an output voltage indicative of a sensed pressure using an input voltage. The passive compensation circuit that includes a span resistor, first and second compensation resistors, and a zero offset resistor. The passive compensation circuit is configured to control current through the plurality of strain gauges to control the output voltage for a selected temperature range and a selected pressure range.

A passive compensation circuit for a pressure sensor includes a span resistor, first and second compensation resistors, and a zero offset resistor. The span resistor is connected between an input voltage and the pressure sensor and is configured to control a range of an output voltage for a pressure range of the pressure sensor. The first and second compensation resistors are operatively connected in parallel with the pressure sensor and are configured to control current provided to the pressure sensor. The zero offset resistor is operatively connected between the first and second compensation resistors and the pressure sensor and is configured to control a base value of the output voltage for zero pressure.

DETAILED DESCRIPTION

A system and method is disclosed herein for passively compensating for temperature variation in strain gauge sensors. The system includes a strain gauge sensor that includes four strain gauges configured in a Wheatstone bridge and a temperature error compensation circuit. The temperature error compensation circuit may include two span resistors, two zero offset resistors and four compensation resistors. The span resistors are configured to set the span of the output voltage of the sensor over a selected pressure span. The zero offset resistors are configured to set the output voltage that corresponds to a pressure of 0 psi, for example. The compensation resistors are configured to control the current to the Wheatstone bridge from the input voltage to compensate for changes in the behavior of the strain gauges over a selected temperature range.

To set the values of the span, zero offset and compensation resistors, the strain gauges are first tested for a selected number of reference conditions, which may include selected pressures and temperatures. Following the test, the resistances of the strain gauges are modeled in relation to temperature and pressure based on the tests. The resistances of the span, zero offset and compensation resistors are also modeled in relation to temperature based on, for example, manufacturer specifications. The resistance models are provided to a computer system which determines the values of resistance for each of the span, zero offset and compensation resistors that minimize output error of the sensor for the selected temperature and pressure spans. This way, passive temperature error compensation may be achieved for strain gauge pressure sensors.

Figure 1:
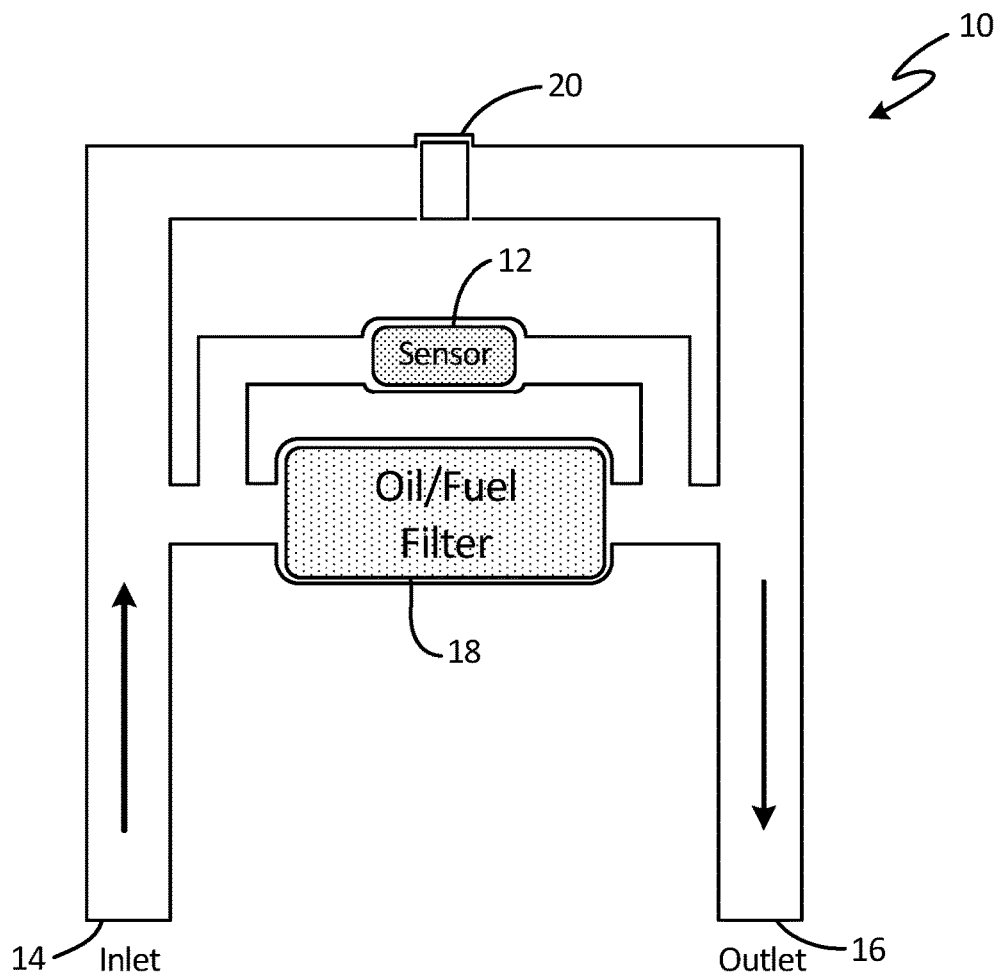
FIG. 1 is diagram illustrating a fuel system that incorporates a strain gauge pressure sensor.

FIG. 1 is a diagram illustrating a fuel system 10 that includes a strain gauge pressure sensor 12. While illustrated as fuel system 10, pressure sensor 12 may be implemented in any other system in which sensing pressure is desirable such as, for example, any fluid pressure or gas pressure systems. Fuel system 10 may be an aircraft fuel system and may include pressure sensor 12, fluid inlet 14, fluid outlet 16, oil/fuel filter 18, and bypass valve 20. Pressure sensor 12 may be configured to measure the pressure between fluid inlet 14 and fluid outlet 16. Pressure sensor 12 may be implemented utilizing strain gauges, for example, configured to provide an electrical resistance that varies based on the strain placed on the strain gauges.

During normal operation, fluid flows from inlet 14, through oil/fuel filter 18, and out fluid outlet 16. However, particles may get caught in oil/fuel filter 18, impeding the flow of fluid from inlet 14 to outlet 16. When this happens, the pressure differential across filter 18 increases. A controller (not shown) may monitor the output of pressure sensor 12 to determine when the pressure differential across filter 18 is indicative of a clogged filter.

Fuel system 10 may be a high temperature environment having temperatures greater than 200° C., for example. Pressure sensor 12, which may be implemented as a microelectromechanical systems (MEMS) device with strain gauges, may be sensitive to changes in temperature. In prior art systems, active compensation was employed to account for the effects of temperature variation on pressure sensor 12. With active compensation, a microcontroller monitors the temperature utilizing a separate temperature sensor. Using the sensed temperature, the controller actively calculates and adjusts the sensed pressure. This method requires expensive circuitry and a temperature sensor, and often has to be implemented remotely from pressure sensor 12. Further, for very high temperature environments, active compensation is not feasible.

Figure 2:
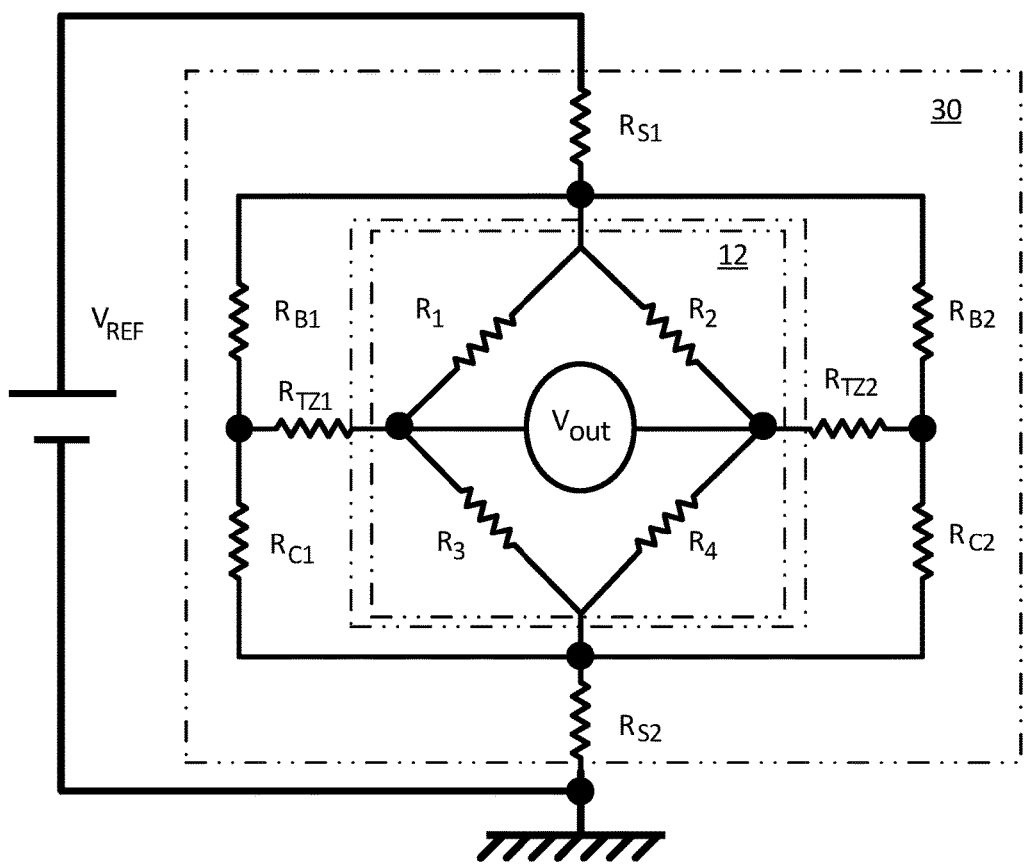
FIG. 2 is a circuit diagram illustrating a configuration of a passive temperature compensation circuit for a strain gauge sensor.

FIG. 2 is a circuit diagram illustrating sensor 12 that includes passive temperature error compensation circuit 30. Pressure sensor 12 includes strain gauges, for example, having resistances represented as resistors $R_1$-$R_4$. Temperature compensation circuit 30 includes resistors $R_{S1}$, $R_{S2}$, $R_{B1}$, $R_{B2}$, $R_{C1}$, $R_{C2}$, $R_{TZ1}$ and $R_{TZ2}$. Sensor 12 receives voltage $V_{REF}$ as input and provides an output voltage $V_{OUT}$. $V_{REF}$ may be provided to sensor 12 from a controller (not shown), and $V_{OUT}$ may be provided back to the controller. $V_{REF}$ may be 10 volts, for example. The strain gauges, represented by resistors $R_1$-$R_4$, may be MEMS strain gauges, for example, configured in a Wheatstone bridge.

MEMS strain gauges are devices configured to stretch and compress under varying conditions. When the device is under tension or compression, the electrical resistance of the device changes. This way, the resistance, illustrated as resistors $R_1$-$R_4$, may be monitored to determine a physical property, such as pressure. Modern MEMS strain gauges may be implemented utilizing semiconductor material, for example. The properties of many semiconductor materials are temperature dependent and thus, the behavior of the strain gauges, and in particular the electrical resistances $R_1$-$R_4$, vary based upon the temperature of the environment, which creates output error. It is desirable to compensate for this behavior without the need for an extra temperature sensor and expensive active circuitry.

Resistors $R_{S1}$ and $R_{S2}$ set the strain span of sensor 12. For a pressure sensor, the strain span is the range of output voltage $V_{OUT}$ for a selected pressure span. For example, if sensor 12 is configured to sense pressures from 0 to 900 psi, then the strain span is the range of output voltage $V_{OUT}$ for all pressures from 0 to 900 psi. Resistors $R_{TZ1}$ and $R_{TZ2}$ may be utilized, for example, to set the zero offset of sensor 12. For a pressure sensor, the zero offset of sensor 12 may be the output voltage $V_{OUT}$ at a pressure of 0 psi. For example, for sensor 12 without compensation circuit 30, the resistances $R_1$-$R_4$ may be equivalent at 0 psi, providing an output voltage of 0 volts because the node voltage for the nodes between $R_1$ and $R_3$, and $R_2$ and $R_4$ would be equal. A zero offset of 0.1 volts, for example, would provide an output of 0.1 volts for $V_{OUT}$ at a pressure of 0 psi. Resistors $R_{B1}$, $R_{B2}$, $R_{C1}$ and $R_{C2}$ may be utilized to adjust the current provided to the strain gauges in order to account for temperature variation over the full strain span.

The properties of the strain gauges, including resistances $R_1$-$R_4$, may be set by the manufacturer. However, the values of resistors $R_{S1}$, $R_{S2}$, $R_{B1}$, $R_{B2}$, $R_{C1}$, $R_{C2}$, $R_{TZ1}$ and $R_{TZ2}$ may be selected to minimize the output error for sensor 12 over a selected pressure span and a selected temperature span. For the embodiment illustrated in FIG. 1, the pressure span may be 0-900 psi, for example, and the temperature span may be −60-205° C.

Because compensation circuit 30 is passive, implementing only resistors $R_{S1}$, $R_{S2}$, $R_{B1}$, $R_{B2}$, $R_{C1}$, $R_{C2}$, $R_{TZ1}$ and $R_{TZ2}$, compensation circuit 30 may be co-located with sensor 12. Resistors $R_{S1}$, $R_{S2}$, $R_{B1}$, $R_{B2}$, $R_{C1}$, $R_{C2}$, $R_{TZ1}$ and $R_{TZ2}$, may be included within the same housing as sensor 12, or may be implemented on a separate circuit board outside of, but in close physical proximity to, the sensor housing. This way, temperature compensation may be provided for sensor 12 as a single physical package, as opposed to a completely separate and costly active system.

Figure 3:
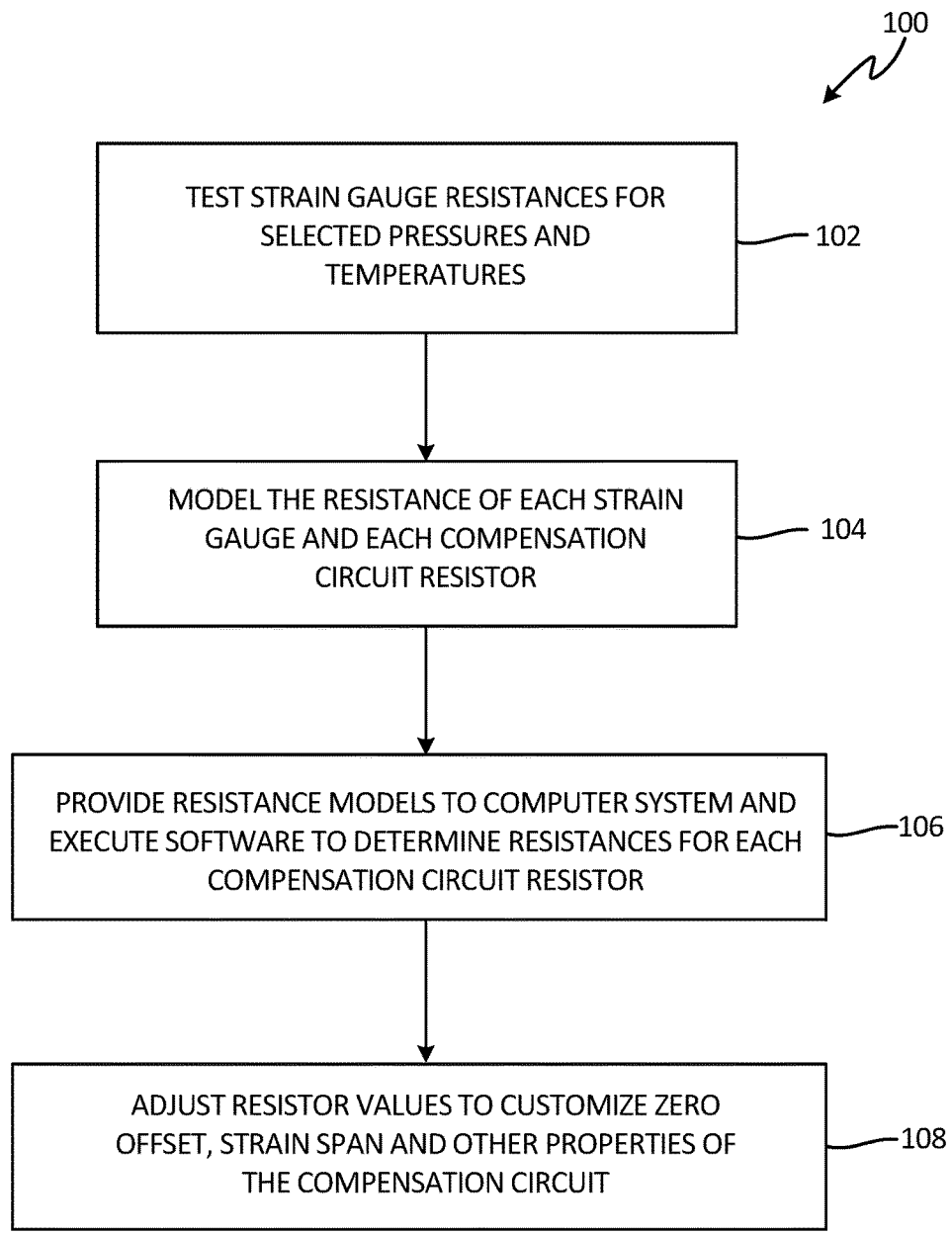
FIG. 3 is a flowchart illustrating a method of determining resistor values for a passive temperature compensation circuit for a strain gauge sensor.

With continued reference to FIGS. 1 and 2, FIG. 3 is a flowchart illustrating method 100 for selecting values for resistors $R_{S1}$, $R_{S2}$, $R_{B1}$, $R_{B2}$, $R_{C1}$, $R_{C2}$, $R_{TZ1}$ and $R_{TZ2}$ of temperature compensation circuit 30. At step 102, resistances $R_1$-$R_4$ are tested for selected temperatures and selected pressures. For example, each of the strain gauges may be tested for three temperatures and three pressures, for a total of 36 measurements. In other embodiments, any number of selected pressures and temperatures may be used.

At step 104, the results of the tests performed at step 102 are utilized to model resistances $R_1$-$R_4$. For example, $R_1$-$R_4$ may each be modeled using the following equation:

$$R_n(T,P) = [a_n + b_n T + c_n T^2] + [d_n + e_n T + f_n T^2]P + [g_n + h_n T + i_n T^2]P^2 \qquad [1]$$

where:
n=1, 2, 3, 4;
T=temperature;
P=pressure; and
$a_n$, $b_n$, $c_n$, $d_n$, $e_n$, $f_n$, $g_n$, $h_n$ and $i_n$ are constants obtained from the tests performed in step 102.

While illustrated in equation [1] as a second order polynomial, higher order polynomials may be utilized to model the resistance of each strain gauge. For higher order polynomials, a greater number reference conditions may be obtained in step 102 in order to accommodate the greater number of coefficients.

The resistances of resistors $R_{S1}$, $R_{S2}$, $R_{B1}$, $R_{B2}$, $R_{C1}$, $R_{C2}$, $R_{TZ1}$ and $R_{TZ2}$ are also modeled in relation to temperature based upon, for example, resistor manufacturer specifications. These resistors $R_{S1}$, $R_{S2}$, $R_{B1}$, $R_{B2}$, $R_{C1}$, $R_{C2}$, $R_{TZ1}$ and $R_{TZ2}$ do not vary with pressure. In other embodiments, tests may also be performed to determine the relationship between the resistances of resistors $R_{S1}$, $R_{S2}$, $R_{B1}$, $R_{B2}$, $R_{C1}$, $R_{C2}$, $R_{TZ1}$ and $R_{TZ2}$ and temperature.

At step 106, the models for $R_1$-$R_4$, $R_{S1}$, $R_{S2}$, $R_{B1}$, $R_{B2}$, $R_{C1}$, $R_{C2}$, $R_{TZ1}$ and $R_{TZ2}$, are provided to a computer system. The computer system may be configured to execute numerical computing software, for example. This software may be capable of solving for all resistances over selected ranges of temperature and pressure. The software may solve for all resistances in order to minimize error over the selected ranges of temperature and pressure. Several factors may be considered when solving for all resistances such as, for example, available computing time and power, and available granulator of resistors. Based on these factors, the number of iterations performed by the computer system in solving for all resistances may be adjusted as desired. By utilizing the computer system to solve for all resistances, the error over the selected temperature and pressure spans for sensor 12 may be reduced, for example, by a factor of ten or greater.

At step 108, customizations of each of resistors $R_{S1}$, $R_{S2}$, $R_{B1}$, $R_{B2}$, $R_{C1}$, $R_{C2}$, $R_{TZ1}$ and $R_{TZ2}$ may be made based upon customer requirements, for example. Some customers may request certain specifications for sensor 12 such as custom zero offsets, or custom strain spans, for example. While all of resistors $R_{S1}$, $R_{S2}$, $R_{B1}$, $R_{B2}$, $R_{C1}$, $R_{C2}$, $R_{TZ1}$ and $R_{TZ2}$ have been selected to minimize the error in $V_{OUT}$, each of the resistors may be slightly adjusted to achieve desired results for a specific customer. For example, $R_{TZ1}$ and $R_{TZ2}$ may be adjusted to provide a desired zero offset for 0 psi, for example. $R_{S1}$ and $R_{S2}$ may be adjusted to provide a desired strain span for $V_{OUT}$. Further customizations may be made, for example, to adjust the sensitivity, input and/or output impedances, and common mode voltage of sensor 12. While making further customizations may slightly increase the error of $V_{OUT}$ over the temperature and pressure spans, customer specifications may be achieved while still reducing the error of sensor 12 by as great as a factor of 10 over the selected temperature and pressure spans for sensor 12.

Discussion of Possible Embodiments

The following are non-exclusive descriptions of possible embodiments of the present invention.

A sensor system includes a plurality of strain gauges and a passive compensation circuit. The plurality of strain gauges are configured to provide an output voltage indicative of a sensed pressure using an input voltage. The passive compensation circuit that includes a span resistor, first and second compensation resistors, and a zero offset resistor. The passive compensation circuit is configured to control current through the plurality of strain gauges to control the output voltage for a selected temperature range and a selected pressure range.

The sensor system of the preceding paragraph can optionally include, additionally and/or alternatively, any one or more of the following features, configurations, operations, and/or additional components:

A further embodiment of the foregoing sensor system, wherein the plurality of strain gauges comprises first, second, third and fourth strain gauges configured in a Wheatstone bridge.

A further embodiment of any of the foregoing sensor systems, wherein the first span resistor is connected between the input voltage and the plurality of strain gauges and is configured to control a range of the output voltage for the pressure range. The first and second compensation resistors are operatively connected in parallel with the plurality of strain gauges and are configured to control current provided to the plurality of strain gauges. The first zero offset resistor is operatively connected between the first and second compensation resistors and the plurality of strain gauges and is configured to control a base value of the output voltage for zero pressure.

A further embodiment of any of the foregoing sensor systems, further including a first node connected between the first and second strain gauges; a second node connected between the first and third strain gauges; a third node connected between the third and fourth strain gauges; and a fourth node connected between the second and fourth strain gauges, wherein the output voltage is measured across the fourth node and the second node.

A further embodiment of any of the foregoing sensor systems, further including a fifth node connected between first and second compensation resistors, wherein the first compensation resistor is connected between the first node and the fifth node. The first span resistor is connected between a positive terminal of the input voltage and the first node, and the first zero offset resistor is connected between the fourth node and the fifth node.

A further embodiment of any of the foregoing sensor systems, further including a second span resistor connected between ground and the plurality of strain gauges and configured to further control the range of the output voltage for the pressure range.

A further embodiment of any of the foregoing sensor systems, further including third and fourth compensation resistors operatively connected in parallel with the plurality of strain gauges and configured to further control the current provided to the plurality of strain gauges; and a second zero offset resistor operatively connected between the third and fourth compensation resistors and the plurality strain gauges and configured to further control the base value of the output voltage for zero pressure.

A further embodiment of any of the foregoing sensor systems, further including a sixth node connected between third and fourth compensation resistors, wherein the third compensation resistor is connected between the first node and the sixth node. The second span resistor is connected between the ground and the third node, and the second zero offset resistor is connected between the sixth node and the second node.

A method of configuring the passive compensation circuit of any of the foregoing sensor systems, the method including testing the first, second, third and fourth strain gauges for a plurality of reference pressures and a plurality of reference temperatures; generating, using a computer, a plurality of constants based on the test of the first, second, third and fourth strain gauges; generating resistance equations for the first, second, third and fourth strain gauges using the plurality of constants; and determining, using the computer, resistance values for the first and second span resistors, the first, second, third and fourth compensation resistors, and the first and second zero offset resistors based upon the resistance equations.

A further embodiment of the foregoing method, wherein determining, using the computer, the resistance values includes selecting the resistance values such that the error of the output voltage is reduced by greater than a factor of ten over the selected temperature range and the selected pressure range.

A further embodiment of any of the foregoing methods, wherein testing the first, second, third and fourth strain gauges for the plurality of reference pressures and a plurality of reference temperatures includes testing the first strain gauge for three first reference pressures and three first reference temperatures; testing the second strain gauge for three second reference pressures and three second reference temperatures; testing the third strain gauge for three third reference pressures and three third reference temperatures; and testing the fourth strain gauge for three fourth reference pressures and three fourth reference temperatures.

A passive compensation circuit for a pressure sensor includes a span resistor, first and second compensation resistors, and a zero offset resistor. The span resistor is connected between an input voltage and the pressure sensor and is configured to control a range of an output voltage for a pressure range of the pressure sensor. The first and second compensation resistors are operatively connected in parallel with the pressure sensor and are configured to control current provided to the pressure sensor. The zero offset resistor is operatively connected between the first and second compensation resistors and the pressure sensor and is configured to control a base value of the output voltage for zero pressure.

The passive compensation circuit of the preceding paragraph can optionally include, additionally and/or alternatively, any one or more of the following features, configurations, operations, and/or additional components:

A further embodiment of the foregoing circuit, wherein the pressure sensor includes a plurality of strain gauges configured to provide the output voltage.

A further embodiment of any of the foregoing circuits, wherein the pressure sensor includes a plurality of strain gauges configured to provide the output voltage.

A further embodiment of any of the foregoing circuits, wherein the plurality of strain gauges of the pressure sensor includes first, second, third and fourth strain gauges configured in a Wheatstone bridge.

A further embodiment of any of the foregoing circuits, further including a first node connected between the first and second strain gauges, a second node connected between the first and third strain gauges, a third node connected between the third and fourth strain gauges, a fourth node connected between the second and fourth strain gauges, wherein the output voltage is measured across the fourth node and the second node, and a fifth node connected between first and second compensation resistors, wherein the first compensation resistor is connected between the first node and the fifth node. The first span resistor is connected between a positive terminal of the input voltage and the first node, and the first zero offset resistor is connected between the fourth node and the fifth node.

A further embodiment of any of the foregoing circuits, further including a second span resistor connected between ground and the plurality of strain gauges and configured to further control the range of the output voltage for the pressure range.

A further embodiment of any of the foregoing circuits, further including third and fourth compensation resistors operatively connected in parallel with the plurality of strain gauges and configured to further control the current provided to the plurality of strain gauges, and a second zero offset resistor operatively connected between the third and fourth compensation resistors and the plurality strain gauges and configured to further control the base value of the output voltage for zero pressure.

A further embodiment of any of the foregoing circuits, further including a sixth node connected between third and fourth compensation resistors, wherein the third compensation resistor is connected between the first node and the sixth node. The second span resistor is connected between the ground and the third node, and the second zero offset resistor is connected between the sixth node and the second node.

A method of configuring any of the foregoing circuits, the method including testing the first, second, third and fourth strain gauges for a plurality of reference pressures and a plurality of reference temperatures; generating, using a computer, a plurality of constants based on the test of the first, second, third and fourth strain gauges; generating resistance equations for the first, second, third and fourth strain gauges using the plurality of constants; and determining, using the computer, resistance values for the first and second span resistors, the first, second, third and fourth compensation resistors, and the first and second zero offset resistors based upon the resistance equations.

A further embodiment of the foregoing method, wherein determining, using the computer, the resistance values includes selecting the resistance values such that the error of the output voltage is reduced by greater than a factor of ten over the selected temperature range and the selected pressure range.

A further embodiment of any of the foregoing methods, wherein testing the first, second, third and fourth strain gauges for the plurality of reference pressures and a plurality of reference temperatures includes testing the first strain gauge for three first reference pressures and three first reference temperatures; testing the second strain gauge for three second reference pressures and three second reference temperatures; testing the third strain gauge for three third reference pressures and three third reference temperatures; and testing the fourth strain gauge for three fourth reference pressures and three fourth reference temperatures.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sensor system comprising:

first, second, third, and fourth strain gauges connected at respective first, second, third, and fourth nodes to form a Wheatstone bridge, and configured to provide an output voltage indicative of a sensed pressure using an input voltage; and a passive compensation circuit configured to control current through the plurality of strain gauges to control the output voltage for a selected temperature range and a selected pressure range, wherein the passive compensation circuit comprises:

a first span resistor configured to control a range of the output voltage for the pressure range and connected between the first node and the input voltage;

first and second compensation resistors configured to control current provided to the first, second, third, and fourth strain gauges; and a first zero offset resistor configured to control a base value of the output voltage for zero pressure, wherein the first zero offset resistor is connected between the second node and a fifth node, the first compensation resistor is connected between the first node and the fifth node, and the second compensation resistor is connected between the fifth node and the third node, and wherein the output voltage is measured across the second and fourth nodes.

2. The sensor system of claim 1, further comprising:
a second span resistor connected between ground and the plurality of strain gauges and configured to further control the range of the output voltage for the pressure range.

3. The sensor system of claim 2, further comprising:
third and fourth compensation resistors operatively connected in parallel with the plurality of strain gauges and configured to further control the current provided to the plurality of strain gauges; and
a second zero offset resistor operatively connected between the third and fourth compensation resistors and the plurality strain gauges and configured to further control the base value of the output voltage for zero pressure.

4. The sensor system of claim 3, further comprising:
a sixth node connected between the third and fourth compensation resistors, wherein the third compensation resistor is connected between the first node and the sixth node;
wherein the second span resistor is connected between the ground and the third node; and
wherein the second zero offset resistor is connected between the sixth node and the second node.

5. A method of configuring the passive compensation circuit of claim 3, the method comprising:
testing the first, second, third and fourth strain gauges for a plurality of reference pressures and a plurality of reference temperatures;
generating, using a computer, a plurality of constants based on the test of the first, second, third and fourth strain gauges;

generating resistance equations for the first, second, third and fourth strain gauges using the plurality of constants; and determining, using the computer, resistance values for the first and second span resistors, the first, second, third and fourth compensation resistors, and the first and second zero offset resistors based upon the resistance equations.

6. The method of claim 5, wherein determining, using the computer, the resistance values comprising:
   selecting the resistance values such that the error of the output voltage is reduced by greater than a factor of ten over the selected temperature range and the selected pressure range.

7. The method of claim 5, wherein testing the first, second, third and fourth strain gauges for the plurality of reference pressures and a plurality of reference temperatures comprises:
   testing the first strain gauge for three first reference pressures and three first reference temperatures;
   testing the second strain gauge for three second reference pressures and three second reference temperatures;
   testing the third strain gauge for three third reference pressures and three third reference temperatures; and
   testing the fourth strain gauge for three fourth reference pressures and three fourth reference temperatures.

8. A passive compensation circuit for a pressure sensor, wherein the pressure sensor is configured as a Wheatstone bridge that includes first, second, third, and fourth strain gauges connected between respective first, second, third, and fourth nodes, the compensation circuit comprising:
   a first span resistor connected between an input voltage and the first node, and configured to control a range of an output voltage for a pressure range of the pressure sensor, wherein the output voltage is measured across the second and fourth nodes; and
   first and second compensation resistors configured to control current provided to the Wheatstone bridge, wherein the first compensation resistor is connected between the first node and a fifth node, and the second compensation resistor is connected between the fifth node and the third node; and
   a first zero offset resistor connected between the second node and the fifth node and configured to control a base value of the output voltage for zero pressure.

9. The compensation circuit of claim 8, further comprising:
   a second span resistor connected between ground and the third node and configured to further control the range of the output voltage for the pressure range.

10. The compensation circuit of claim 9, further comprising:
    third and fourth compensation resistors operatively connected in parallel with the plurality of strain gauges and configured to further control the current provided to the Wheatstone bridge; and
    a second zero offset resistor operatively connected between the third and fourth compensation resistors and the Wheatstone bridge and configured to further control the base value of the output voltage for zero pressure.

11. The compensation circuit of claim 10, further comprising:
    a sixth node connected between third and fourth compensation resistors, wherein the third compensation resistor is connected between the first node and the sixth node; wherein the second zero offset resistor is connected between the sixth node and the second node.

12. A method of configuring the compensation circuit of claim 11, the method comprising:
    testing the first, second, third and fourth strain gauges for a plurality of reference pressures and a plurality of reference temperatures;
    generating, using a computer, a plurality of constants based on the test of the first, second, third and fourth strain gauges;
    generating resistance equations for the first, second, third and fourth strain gauges using the plurality of constants; and
    determining, using the computer, resistance values for the first and second span resistors, the first, second, third and fourth compensation resistors, and the first and second zero offset resistors based upon the resistance equations.

13. The method of claim 12, wherein determining, using the computer, the resistance values comprising:
    selecting the resistance values such that the error of the output voltage is reduced by greater than a factor of ten over the selected temperature range and the selected pressure range.

14. The method of claim 12, wherein testing the first, second, third and fourth strain gauges for the plurality of reference pressures and a plurality of reference temperatures comprises:
    testing the first strain gauge for three first reference pressures and three first reference temperatures;
    testing the second strain gauge for three second reference pressures and three second reference temperatures;
    testing the third strain gauge for three third reference pressures and three third reference temperatures; and
    testing the fourth strain gauge for three fourth reference pressures and three fourth reference temperatures.

* * * * *